(12) United States Patent
     Liard

(10) Patent No.: US 10,251,461 B2
(45) Date of Patent: Apr. 9, 2019

(54) APPLICATOR FOR A COSMETIC PRODUCT, IN PARTICULAR MASCARA, ASSEMBLY FORMED BY SUCH AN APPLICATOR AND A PRODUCT CONTAINER, AND METHOD AND DEVICE FOR THE PRODUCTION OF SAID APPLICATOR

(71) Applicant: ALBEA SERVICES, Gennevilliers (FR)

(72) Inventor: Jerome Liard, Sainte Jamme sur Sarthe (FR)

(73) Assignee: ALBEA SERVICES, Gennevilliers (FR)

( * ) Notice: Subject to any disclaimer, the term of this patent is extended or adjusted under 35 U.S.C. 154(b) by 70 days.

(21) Appl. No.: 15/324,708

(22) PCT Filed: Jul. 8, 2015

(86) PCT No.: PCT/EP2015/065640
     § 371 (c)(1),
     (2) Date: Jan. 7, 2017

(87) PCT Pub. No.: WO2016/005471
     PCT Pub. Date: Jan. 14, 2016

(65) Prior Publication Data
     US 2017/0208918 A1     Jul. 27, 2017

(30) Foreign Application Priority Data

Jul. 8, 2014 (FR) ..................... 14 56592

(51) Int. Cl.
    *A46B 11/00*     (2006.01)
    *A45D 40/26*     (2006.01)
    (Continued)

(52) U.S. Cl.
    CPC ......... *A45D 40/267* (2013.01); *A45D 34/045* (2013.01); *A45D 34/046* (2013.01); *A45D 40/265* (2013.01); *B29C 45/006* (2013.01); *B29C 45/14426* (2013.01); *B29C 45/2618* (2013.01); *B29C 45/44* (2013.01); *A46B 2200/1053* (2013.01); *B29C 33/005* (2013.01);
    (Continued)

(58) Field of Classification Search
    CPC .. A45D 40/262; A45D 40/265; A45D 40/267; A46B 2200/1053
    See application file for complete search history.

(56) References Cited

U.S. PATENT DOCUMENTS 4,180,175 A    12/1979  Virog, Jr. et al.
6,029,676 A     2/2000  Dumler
(Continued)

*Primary Examiner* — Jennifer C Chiang
(74) *Attorney, Agent, or Firm* — Steven M. Greenberg, Esq.; Shutts & Bowen LLP

(57) ABSTRACT

A cosmetic product applicator, in particular for mascara, is configured to be screwed on a receptacle for a cosmetic product The applicator includes a cover (22), intended to be manipulated by a user, a rod (24), intended to bear an applicator end-piece, and a molded interface zone (30) on which the cover (22) and/or the rod (24) are mounted The interface zone (30) bears a thread (32) for screwing the applicator (20) on the receptacle (10), the thread forming less than one turn.

15 Claims, 3 Drawing Sheets

Figures 1, 4:
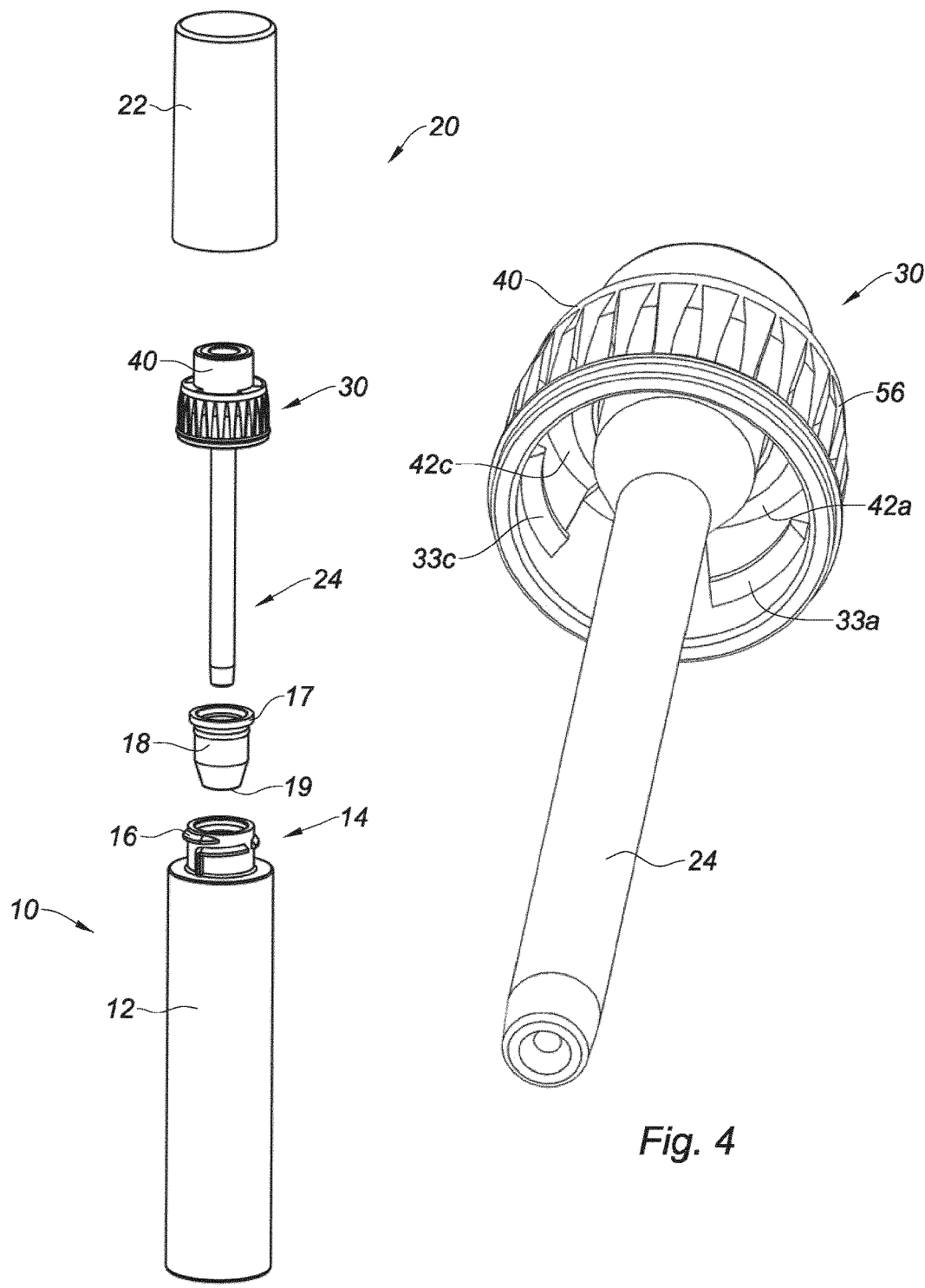

(51) Int. Cl.
*A45D 34/04* (2006.01)
*B29C 45/44* (2006.01)
*B29C 45/14* (2006.01)
*B29C 45/26* (2006.01)
*B29C 45/00* (2006.01)
B29C 33/00 (2006.01)
B29K 23/00 (2006.01)
B29L 31/00 (2006.01)

(52) U.S. Cl.
CPC ..... *B29K 2023/12* (2013.01); *B29L 2031/718* (2013.01)

(56) References Cited

U.S. PATENT DOCUMENTS

| | | | |
|---|---|---|---|
| 8,702,333 B2* | 4/2014 | Geuther | A45D 40/265 401/126 |
| 9,125,473 B2* | 9/2015 | Lefol | A45D 34/045 |
| 9,622,565 B2* | 4/2017 | Weigel | A45D 40/265 |
| 2015/0071696 A1† | 3/2015 | Weigel | |

\* cited by examiner
† cited by third party

APPLICATOR FOR A COSMETIC PRODUCT, IN PARTICULAR MASCARA, ASSEMBLY FORMED BY SUCH AN APPLICATOR AND A PRODUCT CONTAINER, AND METHOD AND DEVICE FOR THE PRODUCTION OF SAID APPLICATOR

CROSS-REFERENCE TO RELATED APPLICATIONS

This application is a § 371 national phase entry of International Application No. PCT/EP2015/065640, filed Jul. 8, 2015, which claims priority to French Patent Application No. 1456592, filed Jul. 8, 2014.

The invention relates to a cosmetic product applicator, an assembly of such an applicator and a receptacle for said product, and a method and device for manufacturing said applicator. Although more particularly provided for mascara, it may also be used with lip balm or any other cosmetic product.

Applicator assemblies for cosmetic products are known, in particular for cosmetic products intended to be applied on the eyelashes, such as mascara, comprising a receptacle containing the cosmetic product and an applicator suitable for being removably fastened on the receptacle.

The receptacle generally comprises a body, the body comprising walls defining a space in which the cosmetic product is contained, and a collar defining an opening through which the cosmetic product can be removed, the collar having a neck.

The applicator generally comprises a cover suitable for being screwed on the mouth, a rod extending from the cover and an applicator end-piece fastened to a free end of the rod. The applicator end-piece comprises a core and a plurality of protuberances or bristles extending from the core. When the cover is fastened on the neck, the rod and the applicator end-piece extend inside the receptacle. The applicator is submerged in the cosmetic product contained in the receptacle. To use the applicator, the user detaches the cover from the neck and removes the applicator from the receptacle.

To prevent the applicator from being overloaded with cosmetic product, the container generally comprises a wiper, fastened to the inside of the neck. When the user removes the applicator from the receptacle, the applicator slides inside the wiper. The wiper wipes the excess cosmetic product on the rod and on the applicator end-piece. The wiper thus makes it possible to adjust the quantity of product present on the applicator end-piece and avoids excessive application of the cosmetic product on the eyelashes.

Such applicators are produced in large series, and their manufacturing methods should be optimized. They are thus formed from molded parts in order to be able to be made at fast paces.

Today, it is known to provide the threads allowing the screwing and unscrewing of the applicator on the receptacle of a part integrating the rod of the applicator. Such a part must therefore be stripped using a rotating movement, corresponding to unscrewing of the part outside its mold. Such an operation extends the cycle time, and subsequently, the manufacturing costs.

The invention proposes to offset the preceding drawbacks and to that end relates to a cosmetic product applicator, in particular for mascara, said applicator being configured to be screwed on a receptacle for said product, said applicator comprising a cover, intended to be manipulated by a user, a rod, intended to bear an applicator end-piece, and a molded interface zone on which said cover and/or said rod are mounted, said interface zone bearing a thread for screwing said applicator on said receptacle, said thread forming less than one turn.

Owing to such a thread, partial thread, it is possible to strip the part that bears it axially. In this way, the manufacturing of the applicator is simplified, which may take place without any rotating movement.

According to one advantageous embodiment, said interface zone forms a connecting part between said rod and said cover. In other words, this is an intermediate part between the rod and the cover. Alternatively, said interface zone may result from the material of the rod and/or the cover.

According to different embodiments of the invention, which may be considered together or separately:
- said thread is angularly interrupted,
- said thread comprises at least two segments,
- said segments are regularly distributed on the periphery of said interface zone,
- said connecting part is molded on said rod,
- said connecting part comprises a body having a longitudinal extension direction, said thread segments being formed on said body,
- said body has a recess net in line with said thread segments, in said longitudinal extension direction of said body,
- said body has an interface part with said cover and an interface part with said rod, said body comprising a shoulder between said interface parts,
- said recesses are made at the level of said shoulder,
- said connecting part and said rod comprise complementary shapes forming axial stops,
- said connecting part and said rod comprise complementary shapes forming angular stops,
- said cover is snapped on said connecting part,
- said connecting part comprises outer ribs, in particular longitudinal, cooperating with said cover to prevent rotation of one relative to the other,
- said cover comprises inner ribs, in particular longitudinal, cooperating with said connecting part to prevent rotation of one relative to the other.

The invention also relates to an assembly of a receptacle and an applicator as described above.

Said receptacle may comprise a body, provided with a neck, and a wiper, mounted in said neck, said rod being configured to compress said wiper against said body of the receptacle according to a cooperation of the cylinder on cylinder type. It has in fact been observed that in the case of closing of the receptacle by the applicator using a partial thread. Such a type of sealing provides better results than sealing of the cone on cone type.

To further improve the sealing, said wiper may comprise a radial bead.

The invention also relates to a method for manufacturing an applicator as described above, said method comprising a step in which said interface zone is molded.

Advantageously, said method comprises a step in which said interface zone is overmolded on said rod, to form a connecting part between said rod and said cover.

The invention also relates to a manufacturing device for carrying out the method described above, said device comprising a mold provided with a cavity for molding said interface zone.

Advantageously, said device comprises a punch and a matrix defining said molding cavity, said matrix comprising extensions, in the form of slots, to define said thread.

Figure 3:
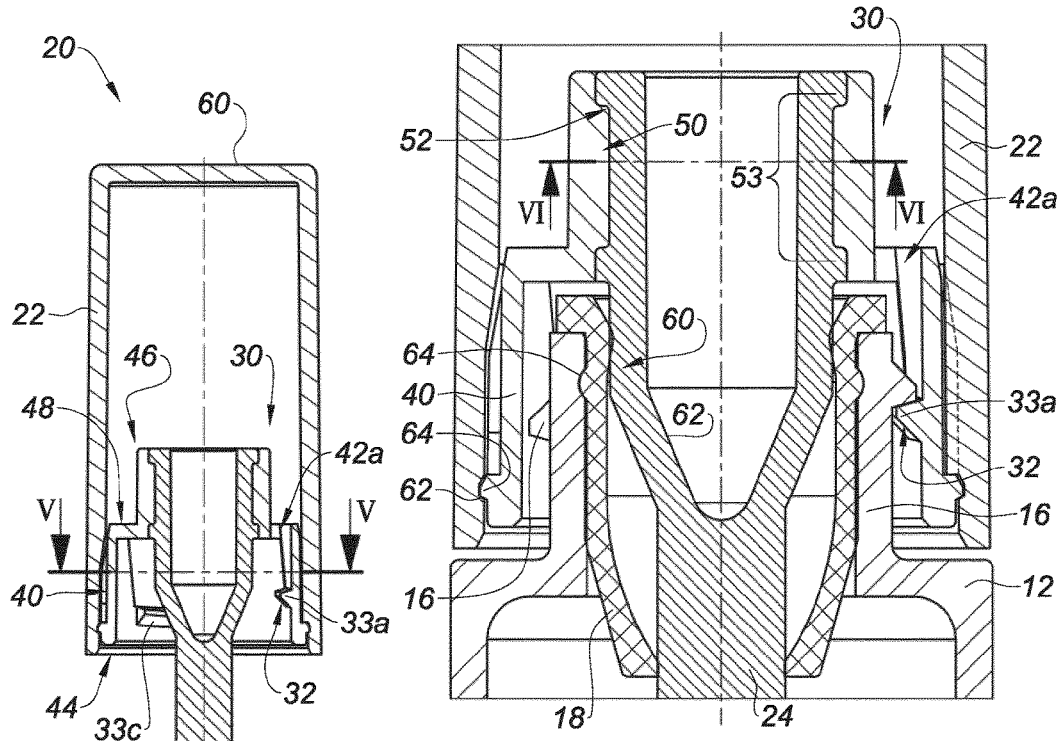
Figure 5:
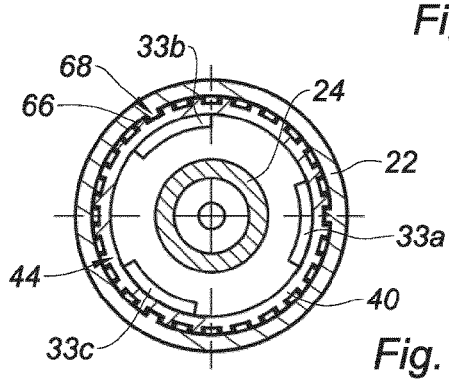
Figure 2:
Figure 6:
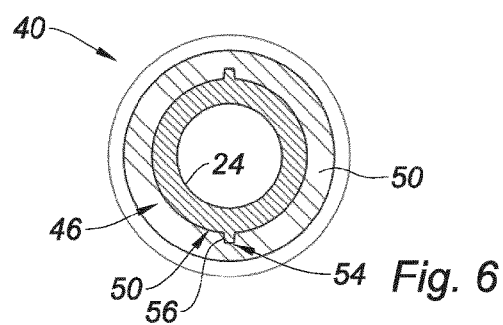

The invention will be better understood, and other aims, details, features and advantages thereof will appear more clearly, during the following explanatory detailed description done of at least one embodiment of the invention, provided solely as an illustrative and non-limiting example, in reference to the appended diagrammatic drawings:

FIG. 1 shows an exploded perspective view of an example assembly of a receptacle and an applicator according to the invention, FIG. 2 shows a longitudinal sectional view of the applicator of FIG. 1, FIG. 3 is a view of part of FIG. 2, completed with part of the receptacle of FIG. 1, the applicator being screwed on the latter, FIG. 4 is a perspective view of the rod of the applicator of FIG. 1, said applicator being illustrated with its interface zone, FIG. 5 is a sectional view along the cutting line V-V illustrated in FIG. 2, FIG. 6 is a sectional view along the cutting line VI-VI illustrated in FIG. 3, FIGS. 7a to 7e illustrate, along a longitudinal cutting plane, a device for manufacturing an applicator according to the invention, according to different steps of the corresponding manufacturing method.

As illustrated in FIG. 1, the invention relates to an assembly of a receptacle 10 for a cosmetic product and an applicator 20 for said product as well as said application 20 itself.

Said receptacle 10 may comprise a body 12 that here extends along a longitudinal extension axis and has a substantially cylindrical shape. Said body 12 forms a cavity accommodating said product. It may be mascara, lip balm or another product. At one of its longitudinal ends, said receptacle 10 comprises a neck 14, having a screwing thread 16. Said thread 16 here extends over more than one turn. It is advantageously interrupted to allow angular indexing of said body 12, in particular with the aim of affixing a decoration thereon in a chosen angular position.

Said body 12 is advantageously a rigid part. "Rigid" means that it cannot be deformable under atmospheric pressure, or under a force exerted by a user's fingers. The body 20 is for example made with a base of a plastic material, in particular polypropylene. It is in particular made by injection or injection blow molding. It may be decorated, in particular by metallization or other means.

Said applicator 20 is configured to be screwed on said receptacle 10, in particular at said neck 14. Said applicator comprises a cover 22, intended to be manipulated by a user, and a rod 24, intended to bear an applicator end-piece, not illustrated, at its free end. Based on the target applications, said applicator end-piece may be a mascara brush, a lip balm spatula or the like. In particular, any type of applicator end-piece forming a mascara brush may be used here, whether molded or twisted, with a straight or curved core. When said applicator 20 is screwed on said body 12, it closes the latter, preferably sealably, and said applicator end-piece is submerged in said product.

Said cover 22 is advantageously a rigid part. "Rigid" means that it cannot be deformable under atmospheric pressure, or under a force exerted by a user's fingers. The cover 22 is for example made with a base of a plastic material, in particular polypropylene. It is in particular made by injection or injection blow molding. It may be decorated, in particular by metallization or other means.

Said rod 24 here is shown assembled with a connecting part 40 that will be detailed later. Said rod 24 is advantageously a rigid part. It may be slightly deformed, in particular curved, under the effect of the forces applied during makeup application, due to its elongate shape. Said rod 24 is for example made with a base of a plastic material, in particular polypropylene.

The receptacle 10 further comprises a wiper 18 for the cosmetic product, intended to be fastened in said body 12 at its neck 14. Said wiper 18 is configured to scrape excess cosmetic product present on the applicator 20, in particular upon removing the latter from the receptacle 10, particularly using a wiping edge 19. Said wiper 18 for example further comprises a shoulder 17 allowing it to be attached on said neck 14. Said wiper 18 is in particular made from rubber.

As illustrated in FIGS. 2 and 3, said applicator comprises a molded interface zone 30, in particular injection molded, on which said cover 22 and said rod 24 are mounted. Said interface zone 30 bears a thread 32 for screwing said applicator 20 on said body 14. Said thread 32 of the receptacle is intended to cooperate with the thread 16 of the receptacle 10. Said thread 32 of the applicator 20 here is positioned on an inner face of a wall of said applicator, while the thread 16 of the receptacle 10 is on an outer face of the receptacle 10.

According to the invention, the thread forms less than one turn. By providing such a thread, it is possible to mold the part bearing said thread while stripping it axially, as explained in more detail relative to FIGS. 6a to 6e.

As better illustrated in FIGS. 4 and 5, one can see that said thread 32 of the applicator 20 here is angularly interrupted. It may for example comprise at least two segments, here three segments 33a, 33b, 33c, regularly distributed over a periphery of said interface zone 30, here at 120° from one another.

If one examines FIGS. 2 and 3 again, one can see that said interface zone 30 forms said aforementioned connecting part 40. In other words, in the illustrated embodiment, said applicator 20 comprises an additional part establishing a connection between said rod 24 and said cover 22. Advantageously, said connecting part 40 is molded, in particular overmolded, on said rod 24. This makes it possible to reinforce the sealing of the receptacle 10, when it is closed by said applicator 20.

Said connecting part 40 here comprises a body having a longitudinal extension direction, said thread segments being formed on said body. Said body further has a recess net in line with said segments, in said longitudinal extension direction of said body. In FIGS. 2 and 3, only one 42a of said recesses, corresponding to the segment 33a, is visible. In FIG. 4, two 42a, 42b of said recesses, corresponding to the segments 33a and 33b, are visible. Said recesses are the result of the manufacturing device used, as will be seen in relation to FIGS. 6a to 6e.

Said body of the connecting part 40 for example has a distal part 44 interfacing with said cover 22 and a proximal part 46 interfacing with said rod 24. A shoulder 48 connects said interface parts 44, 46, said recesses being formed at said shoulder 48. Said distal and proximal parts of said connecting part are for example cylindrical. Here, they are positioned coaxially to one another as well as to said rod 24 and said cover 22.

Advantageously, said connecting part 40 and said rod 24 comprise complementary shapes forming axial stops. Here, this involves a ring 50 inwardly formed in said proximal part 46 of the connecting part 40 cooperating with a groove 52 formed in a proximal end of the rod 24, between two annular flanks 53 that are axially separated from one another.

As illustrated in FIG. 6, said connecting part 40 and said rod 24 may further comprise complementary shapes forming angular stops. Here, this involves a rib 54, coming from the bottom of said groove 52 of the rod 24, cooperating with a slot 56 situated across from the ring 50 of said proximal part of the connecting part 40.

If one examines FIGS. 2 and 3 again, one can see that said rod 24 here has a part with a wider diameter at its proximal end. Said groove 52 of the rod 24 is situated at said part with a wider diameter. The opposite distal end of said rod 24 comprises an axial housing 58 for fastening the applicator end-piece.

According to one aspect of the invention, the sealing of the fastening of the applicator 20 on the receptacle 10 is favored by configuring said rod 24 so that it compresses said wiper against said body 12 of the receptacle 10, in particular against an inner face of its neck 14, using a cooperation of the cylinder and cylinder type. Such a type of sealing is in particular appropriate for a short thread, as in the present invention. The contact here is done at the part with a wider diameter, in particular a zone 60 of the part with a wider diameter situated between one 53 of the annular flanks defining said groove 52 of the rod 24 and a frustoconical part 62 connecting said part with a wider diameter to the rest of the rod 24.

To the same end, said wiper 18 may comprise a radial bead 64, here oriented outwardly.

Said cover 22 has an opening at which the connecting part 40 is inserted. Said connecting part 40 is thus situated at an end of said cover 40 axially opposite a bottom 60 of the latter.

Said cover 22 here is snapped on said connecting part 40. To that end, said cover 22 in particular has an annular groove 62 in which a ring 64 is inserted situated at an axial end of said distal part 44 of the connecting part, opposite to the shoulder 48. Alternatively, it may involve teeth and/or notches.

As is better visible in FIGS. 4 and 5, said connecting part 40 may also comprise longitudinal outer ribs 66, cooperating with said cover 22 to prevent rotation of one relative to the other. Likewise, said cover 22 may also comprise longitudinal inner ribs 68, cooperating with said connecting part 40, in particular its outer ribs 66, to prevent rotation of one relative to the other.

The invention also relates to a method and a device for manufacturing an applicator as described above.

Figure 7A:
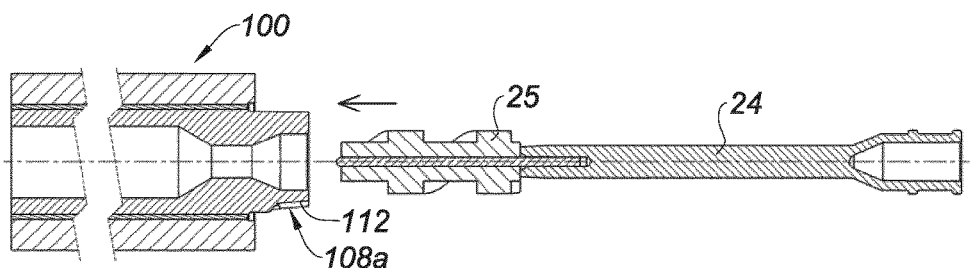

As illustrated in FIG. 7a, said method for example first comprises a step for axially inserting the rod 24 of the applicator into a first part 100 of a mold of said device. Said rod 24 here is provided at its distal end with an applicator end-piece 25, shown diagrammatically.

Figure 7B:
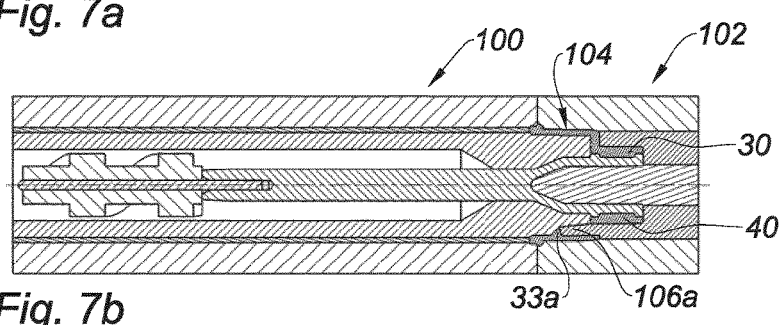

As illustrated in FIG. 7b, said mold is next closed by a second part 102 to form a molding cavity 104 of said interface zone 30. Said method then comprises a step in which said interface zone 30 is molded. More specifically, here, said method comprises a step in which said interface zone 30 is molded on said rod 24 in the form of a connecting part 40 between said rod 24 and said cover 22, said cover 22 not yet being present at this stage of the manufacturing method.

In order to form said thread of the connecting part 40, more particularly said thread segments, said device comprises a punch defining said first part 100, and a matrix, defining said second part 102, said matrix comprising the axial extensions, in the form of slots. Only one 33a of said segments is visible here. Likewise, only one 106a of said extensions, corresponding to the thread 33a, is visible here. Said extension 106a extends toward said punch 100, against which it axially abuts near part of the molding cavity 104 used to mold said thread segment 33a.

If one refers again to FIG. 7a, one can see that said punch includes angular notches, only one 108a being visible here, a flank 110 (visible in FIG. 7c) of said extensions 106a being intended to come into contact with the bottom 112 of said notches. At said extension 106a, said molding cavity extends between said extension 106a itself and another part of the die 102 instead of extending between said die 102 and said punch 100 or between said die 102 and said rod 24, as in the rest of the mold.

Figure 7C:
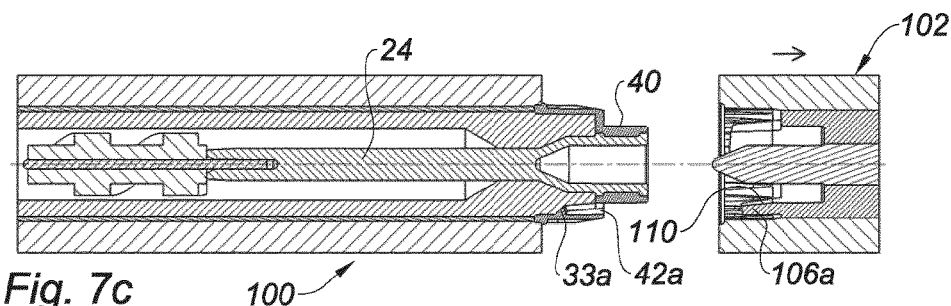

As illustrated in FIG. 7c, said method comprises a subsequent step in which the mold is opened, by removing the matrix 102, in an axial direction, according to the invention. Upon withdrawing, the protuberance 106a frees the recess 42a corresponding to said thread segment 33a.

Figure 7D:
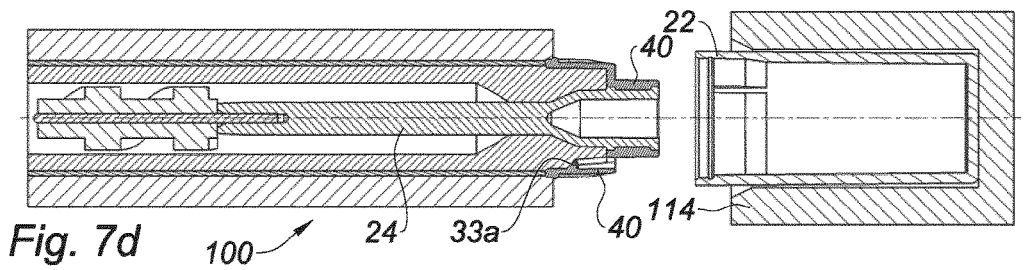

As illustrated in FIG. 7d, said method comprises a subsequent step in which one attaches said cover 22, for example using a robotic arm 114.

Figure 7E:
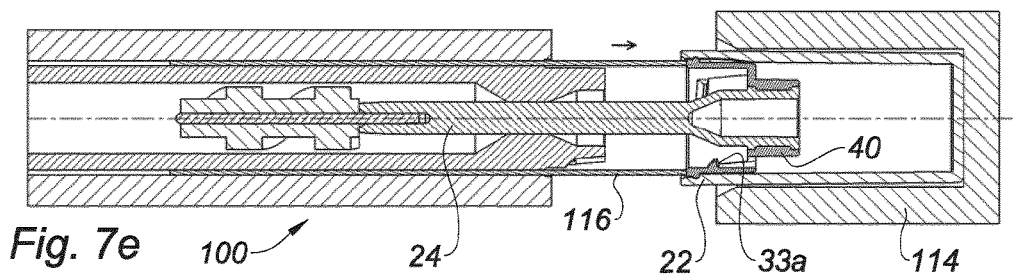

As illustrated in FIG. 7e, said method comprises a subsequent step in which the assembly formed by said rod 24 and said connecting part 40 is ejected outside the part of the mold comprising the punch, in particular using an ejector 116. Said cover 22 is then engaged on the connecting part 40, here by snapping. The robotic arm 114 can then manipulate the applicator, which is then formed.

The invention claimed is:

1. A cosmetic product applicator for mascara, said applicator being configured to be screwed on a receptacle for said product, said applicator comprising a cover manipulable by a user, a rod bearing an applicator end-piece, and a molded interface zone on which at least one of said cover and said rod are mounted, said interface zone bearing a thread for screwing said applicator on said receptacle, said thread forming less than one turn.

2. The applicator according to claim 1, wherein said thread is angularly interrupted.

3. The applicator according to claim 2, wherein said thread comprises at least two segments, regularly distributed over a periphery of said interface zone.

4. The applicator according to claim 1, said applicator further comprising a connecting part between said rod and said cover, said interface zone being formed in said connecting part.

5. The applicator according to claim 4, wherein said connecting part and said rod comprise complementary shapes forming at least one of axial stops and angular stops.

6. The applicator according to claim 4, wherein said connecting part comprises a body having a longitudinal extension direction, said thread being formed on said body, said body having at least one recess net in line with said thread, in said longitudinal extension direction of said body.

7. The applicator according to claim 6, wherein said body has an interface part with said cover and an interface part with said rod, said body comprising a shoulder between said interface parts, said recesses being made at the level of said shoulder.

8. The applicator according to claim 4, wherein said cover is snapped on said connecting part.

9. The applicator according to the claim 8, wherein said connecting part comprises inner ribs cooperating with said cover and said cover comprises longitudinal inner ribs cooperating with said connecting part to prevent rotation of one relative to the other.

10. An assembly of a receptacle and an applicator configured to be screwed on a receptacle for a cosmetic product, said applicator comprising a cover manipulable by a user, a rod bearing an applicator end-piece, and an interface zone on which at least one of said cover and said rod are mounted, said interface zone bearing a thread for screwing said applicator on said receptacle, said thread forming less than one turn.

11. The assembly according to claim 10, wherein said receptacle comprises a body, provided with a neck, and a wiper, mounted in said neck, said rod being configured to compress said wiper against said body of the receptacle according to a cooperation of the cylinder on cylinder type.

12. The assembly of claim 10, wherein said interface zone is molded.

13. The assembly of claim 10, wherein said interface zone is overmolded on said rod.

14. A manufacturing device comprising a mold provided with a cavity for molding an interface zone of an applicator, the applicator comprising a cover manipulable by a user, and a rod bearing an applicator end-piece, the interface zone comprising at least one of said cover and said rod mounted thereon, said interface zone bearing a thread for screwing said applicator on a receptacle, said thread forming less than one turn.

15. The device according to claim 14, said device comprising a punch and a matrix defining said molding cavity, said matrix comprising extensions, in the form of slots, to define said thread.

* * * * *